United States Patent
Breunig et al.

(10) Patent No.: US 6,905,540 B2
(45) Date of Patent: Jun. 14, 2005

(54) LUBRICATING POLYORGANOSILOXANE OIL, AQUEOUS EMULSION CONTAINING SAME, PREPARATION AND USE THEREOF FOR STRIPPING METALS

(75) Inventors: Stefan Breunig, Vienne (FR); Philippe Olier, Lyons (FR)

(73) Assignee: Rhodia Chimie, Boulogne Billancourt (FR)

(*) Notice: Subject to any disclaimer, the term of this patent is extended or adjusted under 35 U.S.C. 154(b) by 93 days.

(21) Appl. No.: 10/276,812

(22) PCT Filed: May 15, 2001

(86) PCT No.: PCT/FR01/01479

§ 371 (c)(1),
(2), (4) Date: Nov. 15, 2002

(87) PCT Pub. No.: WO01/88018

PCT Pub. Date: Nov. 22, 2001

(65) Prior Publication Data

US 2004/0024162 A1 Feb. 5, 2004

(30) Foreign Application Priority Data

May 16, 2000 (FR) .......................................... 00 06234

(51) Int. Cl.$^7$ ................................................ B28B 7/36
(52) U.S. Cl. ........................ 106/38.2; 516/58; 528/25; 528/26; 528/27; 528/31
(58) Field of Search ........................ 106/38.2; 516/58; 528/25–29, 31

(56) References Cited

U.S. PATENT DOCUMENTS 5,043,409 A * 8/1991 Lammerting et al. ......... 528/31
5,389,365 A * 2/1995 LeGrow et al. .......... 424/78.03

FOREIGN PATENT DOCUMENTS

| EP | 0 620 249 | 10/1994 | ............ C08K/5/42 |
| EP | 0 745 632 | 12/1996 | ............ C08G/77/12 |
| EP | 0 755 961 | 1/1997 | ......... C08G/77/385 |
| EP | 0 825 004 | 2/1998 | ............ B29C/33/64 |
| FR | 2 727 119 | 5/1996 | ............ C08G/77/18 |

OTHER PUBLICATIONS

Patent Abstracts of Japan, vol. 017, No. 391 (C–1087), Jul. 22, 1993 & JP 05 070711 A (Nippon Parkerizing Co. Ltd) Mar. 23, 1993 abstract.

International Search Report.

* cited by examiner

*Primary Examiner*—Margaret G. Moore
*Assistant Examiner*—Marc S Zimmer

(57) ABSTRACT

The invention concerns a lubricating organo-functional silicone oil, whether or not in emulsion. The invention aims at improving oils and lubricating silicone emulsions, in terms of emulsion stability, transfer and flow of the oil in emulsion on metal surfaces, of stripping lubricating power, non-clogging of molds and paintability of molded metal articles when used for stripping. In order to achieve said aim, the inventive POS oil is functionalized with the lubricating organophilic radical W (C12–C20 alkyl) and with a radical bearing one or several adhering functions such as diacid, thiol, phosphonate, sulphonate hydroxy, hydroxyamine, amine, ether, amide and their combinations. The invention also concerns emulsions whether or not containing additives, based on said WY functionalized POS oils, the preparation of said oils and said emulsions and their uses when stripping metal articles molded in metal moulds.

14 Claims, No Drawings

LUBRICATING POLYORGANOSILOXANE OIL, AQUEOUS EMULSION CONTAINING SAME, PREPARATION AND USE THEREOF FOR STRIPPING METALS

This application is an application under 35 U.S.C. Section 371 of International Application Number PCT/FR01/01479 filed on May 15, 2001.

The invention relates to organofunctional silicone oils, in particular those with lubricating properties and which may be used especially for stripping metal articles melt-molded and solidified in the shape of a mold, which is also metallic in nature.

The polyorganosiloxanes (POS) according to the invention have properties that have been designed and adapted for this specific application, but, however, the novelty and originality of these functionalized POSs make them products that may be used in many other applications, especially those related to the metalworking industries (cutting fluids).

The invention also uses aqueous silicone emulsions comprising the functionalized POS oils.

The processes for preparing the POS oils and the emulsions are also included in the invention. This is likewise the case as regards a process for molding metallic articles, for example made of aluminum, which involves the POSs and the aqueous silicone emulsions according to the invention.

Without this being limiting, the process for designing the functionalized POS oils according to the invention has its basis in a problem encountered in the field of manufacture of metal articles (e.g. articles made of aluminum) by melting the metal, forming the molten metal in a mold which is also metallic, solidifying the molten metal in the shape imposed by the mold and stripping out the solidified metal article. It is more specifically in the context of this final step that the problem addressed herein is found.

Aluminum is a widespread raw material for molded parts intended for motor vehicles: generator, starter, admission tube, cylinder heads, cylinder covers, oil tank, crankcase and even engine block. The parts are obtained by injecting molten metals (Al alloys) into steel molds. These molds weigh several tons and are very expensive to produce. It is thus important to make these molds profitable by producing a large number of molded parts.

Aluminum melts at and above 690° C. The temperature of the aluminum alloy introduced into the mold is from 720 to 750° C. The introduction is performed under pressure so as to thoroughly fill the deep parts of the mold. During this introduction under pressure, there is considerable friction between the mold and the aluminum. At high pressure and temperature, aluminum reacts with the surface of the mold. Very strong adhesion is thus obtained, or even the formation of amalgams. The molded part is thus strongly attached to the mold and cannot be extracted.

To avoid disastrous situations of this type, stripping agents are used. These agents have several functions. During the introduction of the aluminum under pressure, they must lubricate the surface of the mold. Thus, contact between the steel of the mold and the aluminum is avoided. There is no reaction between the steel and the molten aluminum. The surface of the mold remains unchanged and the part can be stripped without a lot of effort.

It is possible in principle to use any oil to perform the lubrication, provided that it is sufficiently lubricating.

Organic oils may thus be used, but at the high temperatures involved in the metal-stripping application, these organic oils decompose. This decomposition is not unacceptable, provided that the decomposition products:
are lubricating,
are noncorrosive,
contain little gas that is difficult to remove,
do not foul the molds.

Mineral oils are good lubricants and, on decomposition, produce noncorrosive gaseous products, but also charcoal, which considerably fouls the molds. In addition, the fumes evolved during the formation of charcoal are difficult to evacuate.

Silicone oils are not particularly lubricating, but give a low volume of easily removable gas, and do not foul the molds by virtue of the formation of silica at high temperature.

In certain applications, the part must be able to be easily and correctly painted ("paintable"). The residual dimethylsiloxane oils on the stripped parts make it very difficult to apply a paint. Many washes are necessary but this still does not give entirely satisfactory results.

The specifications of a stripping agent based on a lubricating silicone oil would first be that this oil should obviously be a stripping agent, that it should be organophilic (and thus "paintable") and that it should decompose without forming a corrosive gas and without producing a large amount of charcoal residues.

The use of a polyorganosiloxane (POS) silicone fluid, in aqueous emulsion, as a coolant and lubricant, especially for stripping molten metals, is described in French patent No. 2 167 126 filed on 27 Dec. 1972. The functionalized POSs disclosed in said application are:
tetramethyl didodecyldisiloxane,
cyclic oligoorganosiloxane containing 3, 4, 5 or 6 siloxyl units D ($D_3$, $D_4$, $D_5$, $D_6$),
α, ω-trimethylsiloxyl polyorganosiloxane comprising:
siloxyl units $D'=[C_{10}H_{21}(CH_3)SiO]_{0.4}$
siloxyl units $D''=[C_{14}H_{29}(CH_3)SiO]_{0.4}$
and siloxyl units $D'''=[C_6H_5C(CH_3)HCH_2-(Ch_3)SiO]_{0.2}$.

These known POSs are characterized by a viscosity of between about 20 and about 1 500 mm$^2$/s measured at 25° C.

All the viscosities referred to in the present description correspond to a "Newtonian" kinematic viscosity measurement at 25° C., i.e. to the viscosity which is measured, in a manner that is known per se, with a shear rate gradient that is low enough for the measured viscosity to be independent of the rate gradient. For example, the viscosity measured using a "Brookfield" viscometer according to the indications of AFNOR standard NFT 76 106 of May 1982.

These POS oils and the aqueous emulsions containing them which are used in applications relating to metalworking (stripping of molten metals: e.g. aluminum) have been found to be unsatisfactory with regard to:
the lubricating properties assessable by means of the coefficient of friction,
the production of decomposition compounds which are lubricating and noncorrosive, which do not result in the evolution of gases and which do not foul the mold,
the ease of application as a coat onto the metal of the mold,
the transfer of the POS oil brought by the aqueous emulsion onto the surface of the mold,
the spreading of the aqueous emulsion of POS oil onto the metal surface of the mold,
the stripping power,
the "paintability",
the flow properties of the emulsion at the metal surface of the mold, and finally
the cost.

In an attempt to improve the performance qualities of lubricating functional POS oils and the emulsions containing them, U.S. Pat. No. 5,401,801 has proposed to combine the functionalized POS oils with an agent for allowing the silicone emulsion to acquire mechanical stability properties and lubricating properties under extreme pressures, and also improved paintability. This agent consists of an alkyl diphenyl ether disulfonate salt, for example a potassium, lithium or ammonium salt. This agent, which is in fact a surfactant, is present in the emulsion in a proportion of from 0.2 to 10 parts by weight per 100 parts by weight of POS of the polymethylorganosiloxane type bearing trimethylsilyl end groups and of which the radicals for functionalization of the siloxyl units D may be:

a linear alkyl such as dodecyl, an alkylaryl such as α-methylstyryl, or an alkyl residue (for example of C10 or C3 bearing a carboxylic function optionally esterified with a C12 or C17 alkyl radical, for example).

These POS oils and the corresponding aqueous silicone emulsions, as disclosed in U.S. Pat. No. 5,401,801, appear as being perfectible as regards the lubrication, stripping power, "paintability" and cost properties, the harmfulness properties of the products, the decomposition properties and the application properties on the metal surface of the mold (transfer, flow and spreading).

The supplementation of aqueous silicone emulsions based on lubricating functionalized POS oils, as proposed in U.S. Pat. No. 5,401,801, is an approach that has also been adopted in a certain number of other prior art proposals.

Thus, in EP 0 550 528, extreme-pressure additives are added to the aqueous POS emulsion. This is not a satisfactory solution, especially since it generates problems of fouling of the molds and of evacuation of the gases.

Still along this approach, the invention described in JP 11-077 233 relates to an aqueous silicone emulsion of functionalized POSs containing additives of the thickener type (e.g. polyethylene glycol of high molecular mass), acrylic resins, paraffin waxes and/or extreme-pressure additives. It is found that the thickeners are poor lubricants, the paraffin waxes or the like generate decompositions that foul the mold and the acrylic resins are poor stripping agents.

European patent No. 0 585 128 also discloses emulsions of functional silicone oils with an added polymer (polypropylene) which are intended for replacing the organic waxes, in order to minimize the fouling caused by the organic lubricant. This type of solution still remains largely to be improved upon as regards all the points of the specifications sheet.

Another known approach for attempting to solve the problem under consideration herein consisted in seeking to optimize the functionalization of the POS oils.

Thus, Japanese patent application. No. 08 003 578 discloses POSs functionalized with polymethyl methacrylate units, epoxy units and amino units. These reactive units have the aim of increasing the molecular mass of the oils in the emulsion, which should (according to the authors of said patent) improve the amount of products transferred onto the surface of the hot mold. The drawback of this solution is that it is prohibitively expensive and that, in reality, it does not bring about any improvement in the emulsion in terms of spreading and lubricant effect.

European patent application No. 0 825 004 describes a stripping agent consisting of an aqueous silicone emulsion, the main ingredient of which is the product of the coupling reaction between diorganopolysiloxanes, which may be α,ω-trimethylsilyl poly(dimethyl)(methyl)organosiloxanes, comprising methylated siloxyl units D functionalized with:

alkylaryls of the α-methylstyryl type, alkyls of the dodecyl type, alkyl(ethyl)chlorosilanes, or alkyl(ethyl)trimethoxysilanes.

The dimethylated siloxyl units D represent less than 20% of the units D of the silicone chain. This type of functionalization with α-methylstyrene radicals, hydrophobic radicals (for example dodecyl) and alkyltrichlorosilane or alkyltrialkoxysilane radicals appears to afford results in terms of paintability of the stripped metal parts, but has shortcomings as regards the lubricating properties and the ease of application as a coat on the metal surface of the mold. In reality, the type of functionalization adopted in said European patent application No. 0 825 004 is directed toward increasing the viscosity of the oil for stripping, in order also to increase the amount of product available at the surface after applying the emulsion. This result is said to be achieved by means of the limited flow of oil, once it is deposited on the surface of the mold, given its increased viscosity.

In any event, this is found to be insufficient for optimizing POS oil and the emulsion containing it.

EP-A-0 745 632 relates to POSs functionalized in order to give them water-repellency, nonstick, leaktightness and lubricating properties, properties of resistance to bad weather and to temperature, and properties of selective permeability to gases.

The functionalized POSs concerned comprise units D substituted with two methyls and units D functionalized with organosiloxane radicals of —(OSi(CH$_3$)$_2$)$_x$—H type. The terminal units M of these functionalized POSs are of the type —R$^2$A with A corresponding to —(CH$_2$)—$_{1-20}$ and A representing an aminated, epoxidized, hydroxylated or organosilylated functional residue.

The functionalization with —(OSi(CH$_3$)$_2$)$_x$—H side chains is not of a nature to afford the properties expected in stripping applications.

EP-A-0 755 961 discloses POSs functionalized with perfluoro groups. More specifically, these perfluoro groups are of the type: alkylene hinge/perfluoroalkyl residue, alkylene hinge/residue of perfluoroalkyl ester of a dicarboxylic acid (malonate monoester or diester).

Functionalization with perfluoro units is insufficient with regard to the stripping applications ("paintability", lubricating power, ease of application).

The observation cannot be avoided that the prior art does not propose lubricating functionalized POS oils or aqueous silicone emulsions containing them, which offer advantageous performance qualities in terms of emulsion stability, transfer of the oil in emulsion onto the metal surface, spreading of the emulsion over the metal surface, lubrication, stripping power, adverse effect of decomposition (corrosion, gases, fouling) and "paintability" of the metal articles obtained.

Given this state of affairs, one of the essential objectives of the present invention is to propose novel lubricating functionalized POS oils that can satisfy the abovementioned specifications by providing a significantly positive response in terms of improvement of the performance qualities in the context of the metal lubrication/stripping application, inter alia.

Another essential objective of the invention is to provide an aqueous silicone emulsion containing the above-targeted lubricating functionalized POS oil, which may be likened to a genuine improvement over the prior art as regards the lubrication, the stripping power, the limitation of the negative effects of decomposition, the ease of application and spreading as a coat onto the metal surface, the transfer onto this metal surface (mold), the "paintability" of the stripped parts, the flow and the cost.

Another essential objective of the invention is that of offering a novel lubricating functional POS oil, and also an aqueous emulsion containing it, which not only allows a limited flow of the oil or of the emulsion after application to the metal surfaces (for example of the mold), but which also especially optimizes the transfer of the functional POS oil onto the hot metal surface of the mold.

Another essential objective of the invention is that of providing a lubricating functionalized POS oil and an aqueous silicone emulsion containing it, which allow improved contact of the emulsion on the metal surface of the mold.

Another essential objective of the invention is that of providing a novel lubricating functionalized POS oil for stripping and an emulsion containing it, the formulations of which will comprise a limited number of active ingredients of the antifoam, surfactant, thickener, etc. type.

Another essential objective of the present invention is that of providing simple and economical processes for preparing lubricating functionalized POS oils of the abovementioned type.

Another essential objective of the present invention is that of providing a process for obtaining lubricating aqueous silicone emulsions comprising the abovetargeted lubricating functionalized POS oils.

Another objective of the invention is that of proposing a process for manufacturing metal parts by molding and stripping, using a stripping agent of the lubricating functionalized silicone type.

Another essential objective of the invention is that of providing a lubricating functionalized POS oil, especially for stripping molten metals, this oil having the characteristic of having optimized functionalization.

These aims, among others, are achieved by the present invention, which relates firstly, as novel products, to:
polyorganosiloxanes (POS) comprising siloxyl units:
D: $R_2SiO_{2/2}$
optionally M: $R_3SiO_{1/2}$
optionally T: $RSiO_{3/2}$
optionally Q: $SiO_{4/2}$
with R corresponding to hydrogen or to substituted or unsubstituted hydrocarbon-based radicals which may be identical or different;
characterized:
in that at least some of the radicals R correspond to the definitions below:
R=W representing a radical comprising at least 8 and preferably from 8 to 50 carbon atoms and bearing at least one lubricating organophilic function,
and
R=Y representing a radical bearing at least one attachment function capable of forming hydrogen bonds and/or ionic interactions with a metal support;
and in that they correspond to the general formula (I) below:

$$M^\alpha [D^w]_a [D^y]_b [D^R]_c M^\omega \qquad (I)$$

in which:
the radicals $M^\alpha$, $M^\omega$ are units M, which may be identical or different, in each of which R corresponds independently to a linear or branched $C_1$–$C_{12}$ (preferably $C_1$–$C_6$) (cyclo)alkyl group, to an aryl, to an aralkyl or to an alkylaryl, (these groups optionally being substituted), or alternatively to a radical W or Y;

the radicals $D^w$ are units D, which may be identical or different, in each of which at least one radical R corresponds to W; W more especially being selected from the group comprising:
linear or branched C8–C30 alkyls $R^o$,
C8–C30 alkenyls,
aryls, alkylaryls and/or aralkyls,
hydrocarbon-based monovalent radicals of general formula (II):

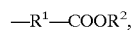
—$R^1$—$COOR^2$, in which
$R^1$ is a divalent hydrocarbon-based radical containing at least 1 and preferably from 2 to 29 carbon atoms; and
$R^2$ is hydrogen or a monovalent hydrocarbon-based radical containing at least 1 and preferably from 1 to 30 atoms;
the monovalent hydrocarbon-based radicals of general formula (III):

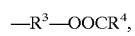
—$R^3$—$OOCR^4$, in which:
$R^3$ is a divalent hydrocarbon-based radical containing at least 1 and preferably from 3 to 29 carbon atoms; and
$R^4$ is a monovalent hydrocarbon-based radical containing at least 1 and preferably from 1 to 30 atoms;
the monovalent hydrocarbon-based radicals of general formula (IV):

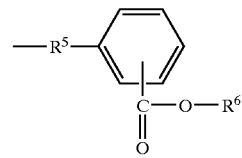

in which:
$R^5$ is a divalent hydrocarbon-based radical containing at least one carbon atom, preferably between 2 and 30 carbon atoms, and
$R^6$ is a monovalent hydrocarbon-based radical containing at least one carbon atom, preferably from 1 to 30 carbon atoms; —$COOR^6$ preferably being in the para position;
the radicals $D^y$ are units D, which may be identical or different, in each of which at least one radical R corresponds to Y chosen from the monovalent radicals of general formula (V):

-Sp-Uac with Sp consisting of a spacer unit selected from hydrocarbon-based radicals, optionally containing silicon, preferably from the divalent hydrocarbon-based radicals of general formula (VI) below:

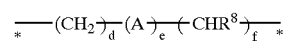

in which:
A represents, independently:

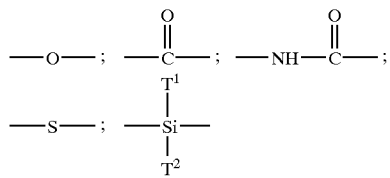

(with $T^1$, $T^2$ independently representing a C1–C6 alkyl or alkoxy)
$R^8$ corresponds to hydrogen or to a hydroxyl;
d=0 to 30
e=0 to 1
f=0 to 30
d+e+f≦40
and with a Uac corresponding to an attachment unit, Uac comprising at least one (preferably two) attachment functions, Uac being selected from monovalent hydrocarbon-based radicals, preferably of the type:
esterified or nonesterified diacids,
thiols,
phosphonates,
sulfonates,
mono- or polyhydroxy,
mono- or polyhydroxy(poly)amine,
mono- or polyamine,
(poly)ether,
(poly)amides,
and combinations of these attachment functions
and even more preferably from the monovalent radicals of general formulae (VII) and/or (VIII) and/or (IX) and/or (X) below:

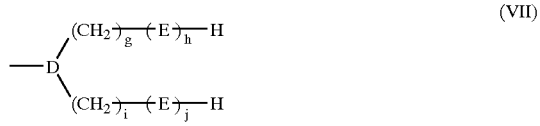
(VII)

in which:
D corresponds to N or CH;
E and E' are identical or different and correspond to:

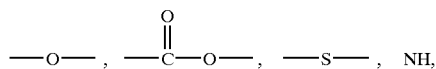

g and i are identical or different and correspond to an integer between 1 and 10;
h and j are identical or different and correspond to 0 or 1, with the condition that if g=h=0, then i and/or j≠0, and vice versa;

(VIII)

in which:
G independently represents an alkyl or halogen substituent;
J independently represents SH, OH, $NH_2$, $N[CH_2)_2—OH]_2$, $SO_3^-$, or $M^+$;
x=0 to 4
y=1 to 5 (preferably y=1 with J in the para position)
x+y=5

$—SO_3^-, M^+$      (IX)

with $M^+$ corresponding to a monovalent cation selected from the group comprising: $Na^+$; $K^+$, $Li^+$, $NH_4^+$;

$—O—PO_3H_2$      (X)

the radicals $D^R$ are units D, which may be identical or different, each of which contain two radicals R corresponding independently to a radical corresponding to the same definition as that given above in the section relating to $M^\alpha$ and $M^\omega$;
10≦a+b≦200;
preferably: 20≦a+b≦200;
and even more preferably: 30≦a+b≦50;
a/b≧0.5
preferably: a/b≧0.8
0≦c≦10
preferably: 0≦c≦5
and even more preferably: 0≦c≦3
with the exclusion of:
POSs (I) comprising at least one siloxyl unit D' substituted with a radical of formula:

$—(OSiR'_2)_x—H$ with R' independently corresponding to a monovalent hydrocarbon-based group free of ethylenic unsaturation and x between 1 and 20; and
POSs (I), at least one of the radicals W or Y of which comprises at least one perfluoroalkyl unit.

The inventors have thus, to their credit, observed that although the increase in viscosity of the lubricating functionalized POS oil does indeed allow the amount of oil deposited on the metal surface to be increased and allows its flow to be limited, it also results in a limitation of the spreading of the emulsion/oil at the surface, resulting in a lack of homogeneity of the deposit and thus, finally, in surface irregularities on the stripped parts.

The inventors have also, to their credit, abandoned the approach which constitutes one of the main routes of the prior art for developing a novel design according to which attachment groups are introduced onto the metals, in particular onto the constituent metals of the molds (steel), to thereby promote the stripping and lubrication of the parts to be stripped, which are, for example, made of aluminum.

The combination of lubricating organophilic functional groups or radicals W and of metallophilic attachment functions Y (with the exclusion of perfluoro functionalization radicals and/or POS side chains containing hydrogenated end functions) is an entirely novel and inventive combination which gives the lubricating POS oil according to the invention particularly advantageous properties in terms of stripping power and lubricating power (very low coefficient of friction), without, however, sacrificing the important aspects in the stripping application, namely: ease of spreading and of flow, "paintability", cost and limitation of the negative effects of decomposition.

In addition, this POS oil is particularly efficient as regards transfer onto the metal surface (for example of the mold), since it is in the aqueous silicone emulsion provided for application as a coat.

The POSs with which the invention is concerned may be linear, branched or cyclic. Naturally, mixtures of these various copolymers may be used to constitute the oil according to the invention.

It is preferable for the POSs to comprise more than 10 siloxyl units, such that they will be copolymers rather than cooligomers.

Even though the POSs according to the invention can comprise, in limited amount, siloxyl units T and/or Q, the POSs in accordance with the preferred embodiment of the invention comprise only units M ($M^\alpha$, $M^\omega$ as defined above) and D ($D^w$, $D^y$, $D^R$ as defined above). Optionally, these POSs MD may also comprise residual units $D^{OH}$, which may be identical or different, in each of which one of the radicals R corresponds to OH and the other radical R corresponds to a C1–C3 alkyl.

For the purposes of the invention, the term "hydrocarbon-based" is directed toward saturated or unsaturated radicals comprising, at the very least, carbon and hydrogen atoms, and optionally silicon atoms, hetero atoms (O, N or S) or other atoms such as metals.

To refine the definition of the units $D^w$ and in particular of the radicals W, it will be observed that the selection according to the invention stopped at organophilic radicals containing long apolar alkyl chains, optionally bearing carboxylate functions and in which the alkyl chain is provided only on one side or on either side of the carboxylate function. The unsaturated and aromatic radicals W also form part of the organophilic substituents that are suitable in the context of the invention.

The C8–C20 linear alkyls and the α-methylstyryl are radicals W that are most particularly preferred in practice.

As regards the siloxyl units $D^y$, and in particular the functional radicals Y, it should be noted that they are preferably chosen from radicals comprising metallophilic attachment functions of the type: esterified or nonesterified diacid (—COO—), —SH, —$H_2PO_4$, —$SO_3$, —OH, —NH—, —$NH_2$, —CO—NH—, —O—.

As regards the siloxyl units $D^R$, $M^\alpha$ and $M^\omega$, their substituents are advantageously, in practice, lower alkyls and even more preferentially methyl radicals.

Naturally, the preferred use of these novel lubricating functionalized POSs will be for stripping molten metals and/or for lubricating metal/metal interfaces. However, this does not exclude other uses for substrates other than metals and for which reducing the coefficient of friction is especially involved. Thus, these novel POSs may, for example, be used as stripping agents or as lubricants in metal/plastic (e.g. polyurethane) interfaces.

Ideally, the number of functional radicals W and Y per linear POS molecule is between 30 and 50, given, moreover, that the radicals W represent more than 80% relative to the functional radicals Y.

According to variants, the functional radicals W and Y may be borne by slightly branched POSs, or even by cyclic POSs, of formula $[D_\alpha^w D_\beta^y D_\gamma]$, with $\alpha+\beta+\gamma \geq 3$ and a and b≠0.

Examples of such variants that may be mentioned include: $D_4^w$, $D_4^y$, $D_5^w$, $D_4^w D_3^y$ and $D_3^w D_2^y$.

According to another variant, all or some of the silicon atoms of the siloxyl units D of the chain can bear 2 functional radicals Y, 2 functional radicals W or one functional radical Y and one functional radical W, the radicals W, on the one hand, and the radicals Y, on the other hand, being identical to or different from each other.

Similarly, the silicons of the end units $M^\alpha$ and $M^\omega$ of the POS chains may be substituted with 1, 2 or 3 functional radicals W and/or Y; the end radicals W being identical or different, and similarly for the radicals Y.

Moreover, each functional radical W or Y may comprise one or more lubricating organophilic functions and one or more attachment units Uac, respectively. Each attachment unit Uac can itself also bear one or more attachment functions Fac.

According to one preferred embodiment of the invention, the POS ideally comprises only functional radicals W and Y in the chain and at the ends, and also radicals R at the ends only.

According to one advantageous characteristic of the invention, the radicals R, $R^o$ to $R^6$ of formulae (I) to (IV) are defined as indicated below:

R is chosen from the group comprising: methyl, ethyl, propyl, butyl, pentyl, hexyl, heptyl, phenyl, tolyl, cyclopentyl, methylcyclopentyl, cyclohexyl, cycloheptyl, methyl being particularly preferred;

$R^o$ is chosen from the group comprising: hexyl, heptyl, octyl, nonyl, decyl, undecyl, dodecyl and other $C_{13}$–$C_{20}$ alkyls;

$R^\infty$ is chosen from the group comprising: vinyl, allyl, acetylene;

$R^1$, $R^3$ and $R^5$ are chosen from the group comprising: ethylene, propylene, methylethylene, butylene, pentylene and other $C_6$–$C_{20}$ alkylenes;

$R^2$, $R^4$ and $R^6$ are chosen from the group comprising: methyl, ethyl, propyl, butyl, pentyl, hexyl, heptyl, octyl, nonyl, decyl, undecyl, dodecyl and other $C_{13}$–$C_{30}$ alkyls, ethylphenyl, propylphenyl, butylphenyl and other alkylaryls, phenylethyl, phenylpropyl, phenylbutyl and other aralkyls.

Examples of radicals W of formula (II) that may be mentioned include:

carboxymethyl, carboxyethyl and carboxypropyl radicals and the other carboxyalkyl radicals;

methoxycarbonylmethyl, methoxycarbonylethyl, methoxycarbonylpropyl, ethoxycarbonylethyl, propoxycarbonylethyl and butoxycarbonylpropyl radicals and the other alkoxycarbonylalkyl radicals.

Examples of radicals W of formula (III) that will be mentioned include: acetyloxymethyl, acetyloxyethyl, acetyloxypropyl, propionyloxyethyl, propionyloxypropyl, butyloxypropyl and the other acyloxyalkyls.

Examples of radicals W of formula (IV) that will be mentioned include: the methyl ester of para- ethyl- (or -propyl-) benzoic acid.

The attachment units Uac and the radicals Y are determining factors for ensuring strong interactions between the silicone and the metal surfaces. Without this being limiting, the inventors have been able to isolate a certain number of units Uac present 1 or more times on each radical Y. Among those that have been found to be particularly efficient, mention may be made of those selected from the group comprising:

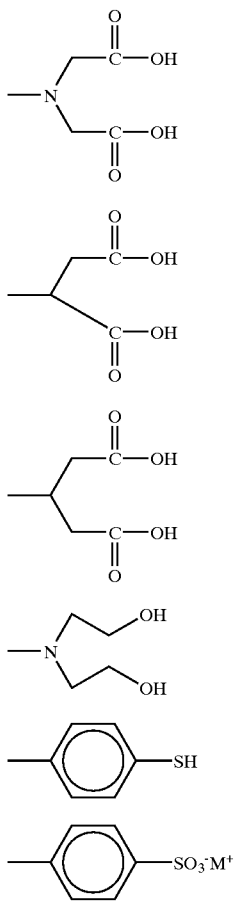

Formula 1

Formula 2

Formula 3

Formula 4

Formula 5

Formula 6

The combination of functional radicals W and Y may optionally cohabit with other functional radicals different than W, Y and R. Thus, according to one alternative, the POS according to the invention may comprise at least one siloxyl unit $D^Z$ (which may be identical or different when there are several) and in which (or in each of which when there are several) at least one radical R corresponds to Z chosen from the group comprising radicals possibly derived from Sp as defined above, and bearing reactive functions Fr:

of epoxy, vinyl, isocyanate, primary or secondary amine, acid halide or alcohol type;

in a proportion of from 0 to 20, preferably from 0 to 10 units Z, for a+b=100 units $D^w$ and $D^y$.

It is clear that the viscosity of the lubricating functionalized POS oils is an important parameter with regard to the application properties, for example: application of a coat to the metal surface of a mold (spreading, flow and homogeneity of the coat). Thus, according to one preferred arrangement of the invention, the POS is in the form of an oil whose viscosity at 25° C. is between 100 and 200 000 mm²/s and preferably between 1 000 and 10 000 mm²/s.

The synthesis and functionalization of the lubricating functionalized POSs according to the invention may be carried out in various ways.

Thus, according to a first embodiment, the invention relates to a process for preparing the above-defined POSs, which consists essentially in reacting:

A) at least one polyalkylhydrogenosiloxane (PAHS) oil (preferably polymethylhydrogenosiloxane), B) with at least one olefinic precursor $OP^Y$ of at least one radical Y and/or of a portion of at least one radical Y, C) and with at least one olefinic precursor $OP^W$ of at least one radical W and/or of a portion of a radical W, D) in the presence of an effective amount of metallic hydrosilylation catalyst, which is preferably platinum-based.

This first preparation mode involves techniques of grafting by hydrosilylation (addition of olefins to the SiH units).

The olefinic precursors $OP^Y$ and $OP^W$ of the radicals W and Y can correspond to all or a portion of the radicals W and Y to be grafted. In other words, this means that the grafting may be envisioned as a single hydrosilylation step or alternatively as a hydrosilylation step followed by successive grafting operations by any suitable chemical reaction or chemical bonding of the remaining chain unit(s) of the radical W or Y to be grafted.

Thus, in accordance with a special case of this first embodiment and in a first stage, precursors $OP^Y$ bearing at least one reactive function Fr per molecule are reacted, this reactive function Fr being selected from the group comprising the following functions:

epoxy and/or hydroxyalkyl.

This therefore amounts to creating a reaction intermediate bearing radicals functionalized with reactive functions Fr (for example epoxy) which reacts with the remaining chain units necessary to construct the entire radical Y.

Insofar as the reactions are never complete, it is possible for the POS to have radicals bearing reactive functions (for example epoxy). This corresponds to the radicals Z that are different than Y and W and defined with reference to the description of the POSs according to the invention.

In a second stage, the functions Fr of the grafts derived from the hydrosilylation of the groups $OP^Y$ (these grafts preferably corresponding to reactive derivatives of the spacer units Sp) are reacted with all or a portion of a precursor of at least one attachment unit Uac.

The hydrosilylation conditions specific to this first embodiment are known per se and are within the capability of a person skilled in the art.

According to a second embodiment of the process according to the invention, condensable silanes and/or oligosiloxanes are functionalized by substituting them with radicals Y and W; preferably by hydrosilylation, and by arranging it such that a hydrolysis/condensation and/or a redistribution then takes place to produce functionalized POSs.

According to this technique, functionalized monomers and/or oligomers are used to begin with, and are placed under conditions such that the copolymer is formed by hydrolysis/condensation and/or redistribution.

According to one variant, the functionalization may be performed on the copolymer formed or on the copolymer during formation.

According to another of these aspects, the invention relates to an aqueous silicone emulsion, characterized in that it comprises at least one POS as defined above, at least one surfactant and other optional active ingredients chosen from the group comprising: antifoams, elongational viscosity promoters, waxes, extreme-pressure additives, antirusts/antioxidants and mixtures thereof.

Advantageously, the surfactant is chosen from alkyldiphenyl ether disulfonate salts. This type of surfactant is described in detail in U.S. Pat. No. 5,401,801 which is incorporated into the present description by reference.

Finally, the invention relates to the process for obtaining this aqueous silicone emulsion. Preferably, this process consists essentially in mixing POS as defined above with the surfactant(s), with water and with the other active ingredient (s), and in carrying out an emulsification by mechanical stirring, during and/or after this mixing.

The mixing and emulsification means may be items of apparatus that are well known to those skilled in the art.

According to one variant that applies in the case when the second embodiment of the POS preparation process is used, the formation of the functionalized POS takes place during the preparation of the emulsion.

According to one variant, it may even be envisioned for the functionalization of the POS with radicals W and/or Y (first POS preparation modes) also to take place during the formation of the emulsion.

Another object of the invention relates to a process that is characterized in that the surface of the mold is lubricated, before and/or during the molding, with the POS the oil as defined above, and/or with the aqueous emulsion as defined above.

More specifically, the invention relates to a process for molding a metal article (preferably made of aluminum) using a mold that is also metallic, characterized in that the metal surface of the mold is lubricated, before and/or during the molding, with the POS oil as defined above, and/or with the aqueous emulsion as defined above.

The present invention will be understood more clearly with the aid of the examples that follow, which describe the preparation of the POS and of the emulsion and the evaluation of the properties of these products in the context of an application for stripping molten metals. With these examples, the advantages and the preparation and implementation variants of the invention emerge fully.

EXAMPLES

Products Used

A—Nonfunctionalized silicone oil:

A1—polymethylhydrogenosiloxane (PMHS) silicone oil comprising from 30 to 50 siloxyl units D:
Rhodorsil® H68 sold by Rhodia Silicones A2—polydimethylsiloxane (PDMS) silicone oil D:
Rhodorsil® H47 1000 from Rhodia Silicones B—Partially functionalized silicone oil (W):

B1—silicone oil comprising units $D^W = -C_{12}H_{25}$:
Rhodorsil® H1658 oil:

B2—silicone oil comprising siloxyl units $D^W$ bearing:
$W_1$=α-methylstyryl
$W_2$=—($-C_{10}H_{21}$)
$W_3$=—($-C_{14}H_{29}$) and sold by the company Dow Corning under the name DC 203.

B3—silicone oil comprising siloxyl units $D^W$ bearing:
W=α-methylstyryl, and sold by Wacker under the name TN.

C—Hydrosilylation catalyst=Pt-based Karstedt catalyst

D—Functionalization precursors:

$OP^W$ (W precursor):
C8 β-olefin=octene
C12 α-olefin=dodecene
C14 α-olefin=tetradecene
flax ester
α-methylstyrene $OP^Y$ (Y precursor):
Sp-Uac precursor=allyl alcohol
Sp precursor=olefinic graft bearing a reactive function Fr:
vinylcyclohexene epoxide (VCMX)
allyl glycidyl ether (AGE)
precursor of the unit Uac, itself bearing attachment functions Fac; this precursor being capable of reacting with Fr:
diethanolamine (DEA)
ethanolamine
AminoDiAcetic Acid (ADAA)

E—Emulsion:

E1—aqueous silicone emulsion based on silicone oil B1, sold under the brand name Rhodorsil® E1858 by Rhodia Silicones E2—emulsion based on silicone oil B3, this emulsion being sold under the name DAG5737 by the company Acheson E3—emulsion based on silicone oil of type B3, this emulsion being sold under the name E3 104 by the company HTS.

Example 1

Preparation of POSs Functionalized with Radicals W and of POSs Functionalized with Radicals W, Y and Z

TABLE 1

| | CONTROL POS [POS (W)] | | | | | POS ACCORDING TO THE INVENTION | | | | |
|---|---|---|---|---|---|---|---|---|---|---|
| POS | $T_1$ A1 | $T_2$ A1 | $T_3$ A1 | $T_4$ A1 | $T_5$ A1 | $I_1$ A1 | $I_2$ A1 | $I_3$ A1 | $I_4$ A1 | $I_5$ A1 |
| $W_1$ | $C_{14}H_{29}$ | $C_8H_{17}$ | $C_{12}H_{25}$ | $C_{12}H_{25}$ | $C_{12}H_{25}$ | $C_{12}H_{25}$ | $C_{12}H_{25}$ | $C_{12}H_{25}$ | $C_{12}H_{25}$ | $C_9H_{11}$ α-methylstyryl |
| $W_2$ | — | — | flax ester | — | — | | | | | |
| Z | | | | | AGE | AGE | AGE | AGE | AGE | AGE |
| Y | | | | | | DEA (25%) | DEA (50%) | DEA (75%) | ADAA | DEA (100%) |

*mol % of DEA/AGE

The POSs $T_1$ to $T_5$ and $I_1$ to $I_4$ of table 1 are prepared by hydrosilylation of olefinic precursors $OP^W$, $OP^Y$ and $OP^Z$ of $D^w$, $D^y$ and $D^z$ starting with hydrogenated nonfunctionalized POSs A1, in the presence of catalyst C.

1.1—Synthesis of an oil ($T_5$) bearing dodecene ($C_{12}$) and allyl glycidyl ether (AGE) functions (i) 400 g of methylcyclohexane and 10 ppm of platinum/overall mass in the form of a Karstedt catalyst are introduced into a reactor. The mixture is heated to 90° C. and 561 g of oil A1 (M=3 162) and 1 339 g of dodecene (M=168; d=0.758) are simultaneously added.

(ii) At the end of the addition, 2.01 g of sodium bicarbonate are added. Next, 155.9 g of allyl glycidyl ether (AGE) are added over 30 minutes and the mixture is maintained at 90° C. until <1 000 ppm of residual SiH functions are obtained.

(iii) A devolatilization is then carried out at 140° C./50 mmHg for 4 hours.

A product containing 45 meq of epoxy function per 100 g is obtained. The viscosity at 25° C. is 1 270 mm²/s. The content of residual SiH functions is 970 ppm.

1.2—Synthesis of an oil ($I_1$) containing dodecene ($C_{12}$), allyl glycidyl ether (AGE) and diethanolamine (DEA) functions The oil $T_5$ (450 g/M=11 307) obtained in 1.1 is introduced into a reactor with 23.4 g of butanol. The mixture is heated to 120° C. and 10.7 g of diethanolamine (DEA) (M=105.14) are added over 30 minutes. The reaction is exothermic. The product obtained is devolatilized at 140° C. under a vacuum of 16 mmHg for 4 hours. A product with a viscosity of 3 320 mm²/s is obtained. 50% of epoxy functions are converted into diethanolamine (DEA) functions.

1.3—Synthesis of the POS oils $T_1$, $T_2$, $T_3$, $T_4$, $I_2$, $I_3$ and $I_4$ The process is performed as indicated above in points 1.1 and 1.2.

The olefinic precursors used in step (i) are all $C_{12}$ except for $T_1$ and $T_2$, which are $C_{14}$ and $C_8$, respectively.

For $T_1$, $T_2$, $T_3$ and $T_4$, only one step (i) is performed to graft $W_1$.

For $I_2$ and $I_3$, the steps (i) and (ii) of 1.1 and the step of 1.2 are performed.

For $I_4$, the process is performed as for $I_1$ to $I_3$ replacing the DEA with AminoDiAcetic Acid (ADAA).

The devolatilization (iii) of 1.1 is advantageously carried out at the end of each of the syntheses mentioned above.

1.4—Synthesis of a functionalized oil $I_5$ $W_1$=α-methylstyryl and Y=Sp precursor=AGE and Uac precursor=DEA 155.3 g (1.31 mol) of α-methylstyrene and 1.41 g of a solution of Karsedt platinum in hexamethyldisiloxane with a content of 0.1% platinum are introduced into the bottom of a 500 ml five-necked reactor. The reaction mass is brought to 90° C. and 70.2 g (1.097 mol SiH) of a polymethylhydrogenosiloxane with a titer of 15.63 mol SiH/kg are added over 5 hours 30 minutes.

At the end of the addition, the degree of conversion DC of the SiH groups by gasometry is 75.3%, and after 30 hours of reaction, it is 94.5%.

9.8 g of allyl glycidyl ether (0.086 mol) are then added and after a further 24 hours of reaction, the degree of conversion is 99.3%. A further 2 g (0.018 mol) of allyl glycidyl ether and 0.74 g of the solution of Karstedt platinum in hexamethyldisiloxane are then added. After reaction for a further 12 hours, the degree of conversion of the SiH units is 99.7%.

The volatiles are then removed by evaporation under vacuum (7 mbar for 1 hour 30 minutes at 90° C.). Assay of the epoxy functions by potentiometry gives 0.38 mol of epoxy/kg and confirms the desired structure.

7.8 g of diethanolamine (0.074 mol) are then added and the reaction mass is maintained at 140° C. for 4 hours. 204.1 g of an oil with a viscosity equal to 97 400 mPa.s (22° C.) are thus collected.

The NMR analysis confirms the structure of the oil.

Example 2

Preparation of Aqueous Silicone Emulsions (Optionally Formulated) from the Functionalized Oils of Example 1

Control emulsion Emulsions according to the invention $ET_1$ $EI_3$, $EI_4$ and $EI_5$ 2.1—Emulsification of the oil $I_3$ (emulsion $EI_3$) Oil $I_3$ (500 g), the surfactants Rhodasurf ROX® (85%; 60 g) and Nansa 1169A (30%; 14 g) and water (32.2 g) are placed in a reactor equipped with a scraping stirrer.

The mixture is stirred vigorously and an immediate inversion is thus obtained. The stirring is reduced. After 30 minutes, the mean diameter should be less than 0.3 μm.

When the particle size is stable, the water (392.65 g) is added with stirring.

Trisodium citrate (1 g) and Proxel GXL (1.5 g) are added. Stirring is continued and a filtration is performed at the end.

A particle size of 0.28–0.3 μm and a solids content of 55–56% are obtained.

2.2—$ET_1$ is prepared in the same way as the emulsion $EI_3$, with the exception of oil used (oil $T_1$).

2.3—$EI_2$, $EI_4$ and $EI_5$ are prepared in the same way as the emulsion $EI_3$, with the exception of the oil used, respectively: $I_2$, $I_4$ and $I_5$.

2.4—Preparation of the formulation F $EI_3$-a starting with the emulsion $EI_3$:

The emulsion obtained in 2.1 (10 g) is diluted by gradual addition of deionized water (39.5 g) containing 0.5 g of Crodet S40. A solids content of 10% is obtained. 5 mg of antifoam A414 from Rhodia Silicones SAS are added.

2.5—Preparation of formulation F $EI_3$-b starting with the emulsion $EI_3$:

The emulsion obtained in 2.1 (3 g) is diluted by gradual addition of deionized water (11.8 g) containing 0.15 g of Crodet S40 and 0.06 g of polyethylene glycol (Mw=5 000 000). A solids content of 10% is obtained. 5 mg of antifoam A414 from Rhodia Silicones SAS are added.

2.6—Formulations $FE_1a$, $FE_1b$ and $FE_1c$ (see table 6 below) are prepared from the emulsion $E_1$ using, for $FE_1a$, the same methodology as for $FEI_3$-a and, for $FE_1b$ and $FE_1c$, the same methodology as for $FEI_3b$.

Example 3

Evaluation of the POS Oils and the Emulsions 3.1—The Application Tests that Allow a Silicone Oil to be Evaluated in Terms of Stripping Are:

a) Determination of the coefficients of friction for a coat of about 60 μm of oil on a steel plate by friction with a bead. This test allows the oils to be evaluated in terms of the lubricating power and stripping power.

The coefficient of friction of the oils is determined by tribological measurement. The oils to be compared are deposited so as to obtain a uniform coating on a steel plate. The thickness of the film deposited must be comparable for all the oils.

Steel disks 42 mm in diameter and 2 mm thick are used. These disks are degreased with petroleum ether followed by acetone. The oils are applied using a brush. The thickness is measured, nondestructively, with a Foucault current sensor.

A pin-on-disk tribometer is used. The pin is a steel bead (100C6) 5 mm in diameter. It is cleaned with ethanol before use. The bead rests on the steel disk treated with the oil to be evaluated.

The disk rotates at a speed ω=25 rpm, which corresponds to a speed of travel of 2 m/min. The load on the pin is 2 g, the temperature is 23° C. and the relative humidity of the air is 50%. The force with which the pin is entrained is measured with a sensor installed in the bead-holding arm. A high force corresponds to a poor lubricating effect. The coefficient of friction is calculated according to f=F/N (Coefficient of friction=Frictional force (measured by the sensor/load (2 g)).

b) Determination of the residual amount of oil after deposition on a hot steel plate inclined at 45°, at 300° C. This test makes it possible to measure the flow of the oil and thus allows the losses of oil to be minimized by optimizing the structure.

The oils are deposited on a 10×10 cm stainless-steel plate inclined at 45°. This plate is placed on a hotplate. The temperature is adjusted by a thermocouple and the exact temperature of the plate is checked with a surface thermometer.

The oils are deposited with a precision syringe to allow the application of a single drop of oil of well-defined size.

The plate is brought to the working temperature. Five drops of oil are dropped onto the plate from a height of two centimeters and at a spacing of about 1 cm. They are left to run for one minute. The plate is removed and left to cool in a horizontal position. The length of the run left by the oil on the plate is measured. An oil that sets to a solid or an oil that bears functions which interact strongly with the surface flow less, which is desired.

c) Determination of the residual amount of stripping agent present on a hot steel plate inclined at 45°, at 200° C. and 250° C. This test makes it possible to evaluate the efficacy of the emulsions and to optimize the amount of product applied and minimize the amount lost by the flow by optimizing the structure.

The emulsion is diluted to the chosen solids content and transferred into a syringe equipped with a flat-ended needle. The syringe is placed in a syringe pusher to ensure a constant and repeatable flow rate. The end of the syringe is placed 40 cm from the surface receiving the drops.

The plate receiving the drops is a 1×7 cm sanded steel plate. This plate is placed on a 10×20 cm stainless-steel protective plate, which is in turn placed on a hotplate. The plates are inclined at 45°. The temperature is adjusted by a thermocouple placed on the surface of the 10×20 cm stainless-steel protective plate. The temperature of the receiving plate is checked with a surface thermometer. The point of impact of the drops of emulsion is set 4 cm from the bottom of the receiving place.

The plate is brought to the working temperature. A precise number of drops of emulsion are dropped onto the tared receiving plate. After application, the receiving plate is removed and weighed. The difference in weight indicates the amount of product transferred for the chosen emulsion.

The process is repeated for each emulsion to be evaluated under the same conditions, in order to allow comparison.

3.2—Results a)
As regards the coefficient of friction of the various test oils, the following results are obtained:

TABLE 2

| Oil | Viscosity | Coefficient of friction |
|---|---|---|
| $T_1$ | 1 400 (crystal 18° C.) | 1.01 |
| $T_2$ | 600 | 0.842 |
| $A_2$ | 1 000 | 0.796 |
| $B_2$ | 1 600 | 0.781 |
| $T_3$ | 800 | 0.643 |
| $B_3$ | 1 400 | 0.582 |
| $B_1$ | 1 200 | 0.566 |
| $T_5$ | 1 300 | 0.520 |
| $I_2$ | 3 300 | 0.428 |
| $I_5$ | 11 200 | 0.483 |

The results clearly demonstrate the superior efficacy of the oil of the invention ($I_2$) compared with the reference products ($T_1$, $T_2$, $A_2$, $B_2$, $T_3$, $B_3$ and $B_1$). Since the coefficient of friction is much lower than that of the other products, better performance qualities in terms of stripping are expected for an equal amount. $T_5$ allows a correct coefficient of friction to be obtained, but gives unacceptable results as regards the deposit on the steel plate (tables 3, 4 and 5).

b)
The application of various oils to a 10×10 cm steel plate heated to 300° C. inclined at 45° serves as a test to minimize the flow and thus the losses of product. Five drops of product are applied separately by syringe and the amount of product remaining on the plate is measured after one minute at 300° C.

Table 3 below collates the results:

TABLE 3

| Oil | Visco oil | % attached product | % attached product (7.7 cm*) | Length of the run produced (5 tests, cm) |
|---|---|---|---|---|
| $T_4$ | 1 200 | 52.38 | 26.19 | 7.7* |
| $T_1$ | 1 400 | 60.68 | 49.57 | 7.7* |
| $B_3$ | 1 450 | 50.84 | 17.79 | 7.7* |
| $I_1$ | 2 500 | 67.72 | 45.67 | 7.0 |
| $I_2$ | 3 300 | 60.80 | 60.80 | 5.5 |
| $I_3$ | 5 700 | 62.07 | 62.07 | 4.1 |
| $I_4$ | — | 56.73 | 56.73 | 6.0 |

The tests are performed on 10×10 cm steel plates heated to 300° C. and inclined at 45°

The drops are applied by syringe and are left for 1 minute before the plate is removed ADAA: aminodiacetic acid/DEA: diethanolamine/AA: allyl alcohol

*=came off the plate, product overflows and runs.

A large minimization of the flow is observed by virtue of the introduction of the function Y. The flow decreases as the content of function Y increases. At 300° C., the viscosities of all the products are very low. The efficacy of the function Y is thus demonstrated for the application of the pure oils.

c)
The application of the emulsions to a hot steel plate, inclined at 45° and heated to 200° C. was also evaluated. The application of 100 drops of emulsion (about 1 g) containing 10% oil, for 2 minutes from a height of 40 cm simulates the industrial application of the emulsion. The weight of the treated plate is measured before and after application, which makes it possible to measure the amount of product transferred onto the plate, and thus to evaluate the efficacy of the deposit.

Table 4 collates the results:

TABLE 4

| Emulsion | Base oil | Visco at 25° C. | % attached product | % of oil transferred |
|---|---|---|---|---|
| $E_3$ | $B_3$ | 1 200 | 0.40 | 4.0 |
| $E_2$ | $B_3$ | 1 400 | 1.65 | 16.5 |
| $E_1$ | $B_1$ | 1 200 | 0.03 | 0.3 |
| $ET_1$ | $T_1$ | 1 400 | 0.57 | 5.7 |
| $ET_5$ | $I_1$ | 1 300 | 0.08 | 0.8 |
| $EI_4$ | $I_4$ | 3 300 | 1.74 | 17.4 |
| $EI_5$ | $I_5$ | 11 200 | 1.18 | 11.8 |

The results show that there are very large differences between the various emulsions in terms of amount of product transferred onto the hot plate, and thus in terms of efficacy of the product.

The product $E_2$ gives the best results at 200° C. Its formulation is superior to that of $E_3$.

The results above all show that, even before optimizing the formulation of the emulsion and without the addition of wax, a result superior to that of $E_2$ is obtained when the oil of the invention is used as an emulsion ($EI_2$). The transfer of the oil according to the invention onto the hot plate is markedly better than for standard oils.

Furthermore, the oil $I_2$ makes it possible to exceed the performance qualities of the emulsions specially formulated for the application.

d)
The products were also evaluated at a temperature of 250° C. The test conditions are, apart from the temperature, equivalent to those of the tests at 200° C.

Table 5 collates the results:

TABLE 5

| Emulsion | Base oil | Visco at 25° C. | % attached product | % of oil transferred |
|---|---|---|---|---|
| $E_3$ | $B_3$ | 1 200 | 0.231 | 2.31 |
| $E_2$ | $B_3$ | 1 400 | 0.050 | 0.50 |
| $E_1$ | $B_1$ | 1 200 | 0.087 | 0.87 |
| $ET_1$ | $T_1$ | 1 400 | 0.067 | 0.67 |
| $ET_5$ | $T_5$ | 1 300 | 0.088 | 0.88 |
| $EI_2$ | $I_2$ | 3 300 | 0.259 | 2.59 |
| $EI_5$ | $I_5$ | 11 200 | 0.410 | 4.10 |

The results at 250° C. also show the very large differences between the emulsions in terms of the amount of product transferred onto the hot plate, and thus in terms of efficacy of the product.

The results show that, even at 250° C., a result superior to that of the control products is obtained with the emulsion according to the invention. The transfer of the oils according to the invention onto the hot plate is markedly better than for control oils to the point of exceeding the performance qualities of the emulsions specially formulated for the application.

e)
An optimization of the emulsion is performed by adding a surfactant and an antifoam that are well suited to the application. These two products, chosen from a first series of tests, using a large number of surfactants, are satisfactory in the formulation according to the invention. By adding them, the efficacy can be optimized. The tests are performed at 200° C. under the test conditions of application onto a hot plate mentioned in paragraph 3.2.c).

Table 6 collates the results:

TABLE 6

| Emulsion | Base oil | Formulation | % attached product | % of oil transferred |
|---|---|---|---|---|
| $E_3$ | $B_3$ |  | 0.40 | 4.0 |
| $E_2$ | $B_1$ + Wax |  | 1.65 | 16.5 |
| $FE_1a$ | $B_1$ | Crodet S40 + A 414 | 0.063 | 0.63 |
| $FE_1b$ | $B_1$ | PEG 0.2% | 0.077 | 0.77 |
| $FE_1c$ | $B_1$ | PEG 0.4% | 1.63 | 16.3 |
| $E_1$ | $B_1$ | — | 0.030 | 0.30 |
| $FEI_3b$ | $I_2$ | PEG 0.4% | 3.30 | 33.0 |
| $FEI_2a$ | $I_2$ | Crodet S40 + A 414 | 2.62 | 26.2 |
| $EI_2$ | $I_2$ | — | 1.74 | 17.4 |

The emulsions formulated or nonformulated and based on the oil $I_2$ according to the invention give particularly advantageous results in terms of transfer onto a steel plate at 200° C.

The formulation $FEI_2b$ affords a 58% improvement in the transfer efficiency compared with the control $E_2$.

What is claimed is:

1. A polyorganosiloxane comprising siloxyl units:

D: $R_2SiO_{2/2}$ optionally M: $R_3SiO_{1/2}$, and with R corresponding to hydrogen or to substituted or unsubstituted hydrocarbon-based radicals which are identical or different;

wherein:

at least some of the radicals R correspond to the definitions below:

R=W representing a radical comprising at least 8 and preferably from 8 to 50 carbon atoms and bearing at least one lubricating organophilic function, and R=Y representing a radical bearing at least one attachment function capable of forming hydrogen bonds and/or ionic interactions with a metal support;

and said polyorganosiloxane correspond to the general formula (I) below:

$$M^\alpha [D^w]_a [D^y]_b [D^R]_c M^\omega \qquad (I)$$

wherein:

the radicals $M^\alpha$, $M^\omega$ are units M, which are be identical or different, in each of which R corresponds independently to a linear or branched $C_1$–$C_{12}$ (cyclo)alkyl group, to an aryl, to an aralkyl or to an alkylaryl, or, alternatively, to a radical W or Y;

the radicals $D^w$ are units D, which are identical or different, in each of which at least one radical R corresponds to W; W being:

linear or branched C8–C30 alkyls $R^\circ$,

C8–C30 alkenyls, aryls, alkylaryls, aralkyls, hydrocarbon-based monovalent radicals of general formula (II):

$$-R^1-COOR^2,$$

wherein $R^1$ is a divalent hydrocarbon-based radical containing at least 1 to 29 carbon atoms; and $R^2$ is hydrogen or a monovalent hydrocarbon-based radical containing at least from 1 to 30 atoms;

the monovalent hydrocarbon-based radicals of general formula (III):

—R³—COOR⁴, wherein:
R³ is a divalent hydrocarbon radical containing at least 1 to 29 carbon atoms; and
R⁴ is a monovalent hydrocarbon radical containing at least 1 to 30 atoms;
the monovalent hydrocarbon-based radicals of general formula (IV):

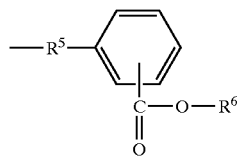

wherein:
R⁵ is a divalent hydrocarbon-based radical containing between 1 and 30 carbon atoms, and
R⁶ is a monovalent hydrocarbon-based radical containing from 1 to 30 carbon atoms;
the radicals $D^y$ are units D, which are identical or different, in each of which at least one radical R corresponds to Y which is a monovalent radical of general formula (V):

-Sp-Uac wherein Sp is a spacer unit which is a divalent hydrocarbon-based radical of general formula (VI) below:

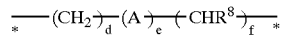

wherein:
A represents, independently:

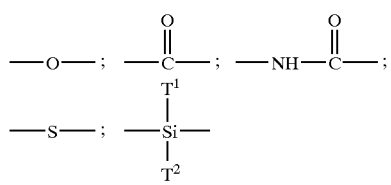

wherein T¹, T² independently representing a C1–C6 alkyl or alkoxy,
R⁸ corresponds to hydrogen or to a hydroxyl;
d=0 to 30
e=0 to 1
f=0 to 30
d+e+f≦40
and wherein Uac is an attachment unit comprising at least one attachment functions, Uac being a monovalent hydrocarbon radical, chosen from:
esterified or nonesterified diacids,
thiols,
phosphonates,
sulfonates,
mono- or polyhydroxy,
mono- or polyhydroxy(poly)amine,
mono- or polyamine,
(poly)ether,
(poly)amides,
a monovalent radicals of general formula (VII) below:

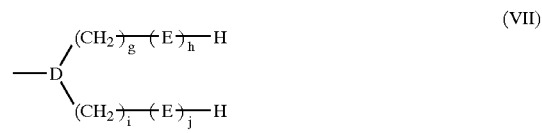

wherein:
D is N or CH;
E and E' are identical or different and correspond to:

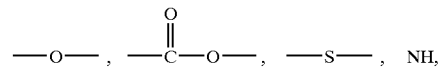

g and i are identical or different and correspond to an integer between 1 and 10;
h and j are identical or different and correspond to 0 or 1, with the condition that if g=h=0, then i and j≠0, and vice versa:
a monovalent radicals of general (VIII)

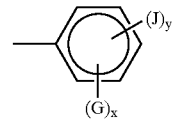

wherein:
G independently represents an alkyl or halogen substituent;
J independently represents SH, OH, NH₂, N[CH₂)₂—OH]₂, SO₃⁻, or M⁺;
x=0 to 4
y=1 to 5 (preferably y=1 with J in the para position)
x+y=5
a monovalent radicals of general formula (IX)

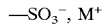

with M⁺ being a monovalent cation selected from the group comprising: Na⁺; K⁺, Li⁺, NH₄⁺; and
a monovalent radicals of general formula (X)

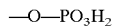

the radicals $D^R$ are units D, which are be identical or different, each of which contain two radicals R having the same definition as that given above in the section relating to $M^\alpha$ and $M^\omega$;
10≦a+b≦200;
a/b≧0.5
0≦c≦10, and
said polyorganosiloxane having residual units $D^{OH}$ which are identical or different, in each of which one of the radicals R is OH and the other radical R is a C1–C3 alkyl, with the further proviso that:
the polyorganosiloxanes (I) comprise at least one siloxyl unit D' substituted with a radical of formula:

with R' independently being a monovalent hydrocarbon group free of ethylenic unsaturation and x between 1 and 20; and
the polyorganosiloxanes (I), wherein at least one of the radicals W or Y comprises at least one perfluoroalkyl unit, are being excluded.

2. A process for preparing the polyorganosiloxanes as defined in claim 1, said process comprising the steps of reacting at least one polyalkylhydrogenosiloxane oil with at least one olefinic precursor OP$^Y$ of at least one radical Y or of a portion of at least one radical Y, and with at least one olefinic precursor OP$^W$ of at least one radical W and/or of a portion of a radical W, in the presence of an effective amount of metallic hydrosilylation catalyst, and wherein precursors OP$^Y$ are bearing at least one reactive function Fr per molecule, said function Fr being

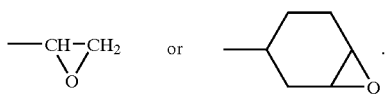

3. The process as claimed in claim 2, wherein the functions Fr of the grafts derived from the hydrosilylation of the groups OP$^Y$ are reacted with all or a portion of a precursor of at least one attachment unit Uac.

4. An aqueous silicone emulsion, comprising at least one polyorganosiloxane as defined in claim 1, at least one surfactant and, optionally, antifoams, elongational viscosity promoters, waxes, extreme-pressure additives, antirusts, or antioxidants, wherein the surfactant is an alkyldiphenyl ether disulfonate salt.

5. A process for molding a metal article using a metallic mold comprising the step of lubricating the metal surface of the mold, before or during the molding, with the POS oil as claimed in claim 1.

6. A process for molding a metal article using a metallic mold comprising the step of lubricating the metal surface of the mold, before or during the molding, with the emulsion as claimed in claim 4.

7. The polyorganosiloxane as claimed in claim 1, wherein the attachment unit Uac of the radical Y is:

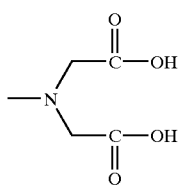

Formula 1

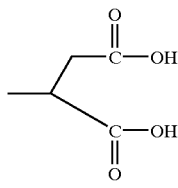

Formula 2

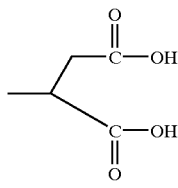

Formula 3

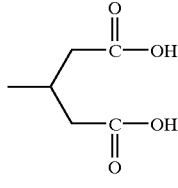

Formula 4

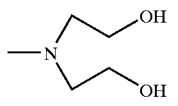

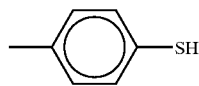

Formula 5

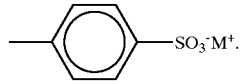

Formula 6

8. A polyorganosiloxane comprising siloxyl units:
D: $R_2SiO_{2/2}$
optionally M: $R_3SiO_{1/2}$, and
with R corresponding to hydrogen or to substituted or unsubstituted hydrocarbon-based radicals which are identical or different;
wherein:
at least some of the radicals R correspond to the definitions below:
R=W representing a radical comprising at least 8 and preferably from 8 to 50 carbon atoms and bearing at least one lubricating organophilic function, and
R=Y representing a radical bearing at least one attachment function capable of forming hydrogen bonds and/or ionic interactions with a metal support;
and said polyorganosilane correspond to the general formula (I) below:

$$M^\alpha [D^w]_a [D^Y]_b [D^R]_c M^\omega \qquad (I)$$

wherein:
the radicals $M^\alpha$, $M^\omega$ are units M, which are be identical or different, in each of which R corresponds independently to a linear or branched C1–C12 (cyclo)alkyl group, to an aryl, to an aralkyl or to an alkylaryl, or, alternatively, to a radical W or Y;
the radicals $D^w$ are units D, which are identical or different, in each of which at least one radical R corresponds to W; W being:
linear or branched C8–C30 alkyls $R^o$,
C8–C30 alkenyls,
aryls, alkylaryls, aralkyls,
hydrocarbon-based monovalent radicals of general formula (II):

—$R^1$—$COOR^2$, wherein
$R^1$ is a divalent hydrocarbon-based radical containing at least 1 to 29 carbon atoms; and
$R^2$ is hydrogen or a monovalent hydrocarbon-based radical containing at least from 1 to 30 atoms;
the monovalent hydrocarbon-based radicals of general formula (III):

—$R^3$—$COOR^4$, wherein:
$R^3$ is a divalent hydrocarbon radical containing at least 1 to 29 carbon atoms; and
$R^4$ is a monovalent hydrocarbon radical containing at least 1 to 30 atoms;
the monovalent hydrocarbon-based radicals of general formula (IV):

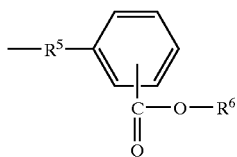

wherein:
R⁵ is a divalent hydrocarbon-based radical containing between 1 and 30 carbon atoms, and
R⁶ is a monovalent hydrocarbon-based radical containing from 1 to 30 carbon atoms;
the radicals $D^y$ are units D, which are identical or different, in each of which at least one radical R corresponds to Y which is a monovalent radical of general formula (V):

-Sp-Uac wherein Sp is a spacer unit which is a divalent hydrocarbon-based radical of general formula (VI) below:

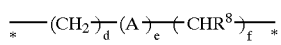

wherein:
A represents, independently:

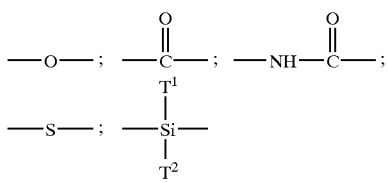

wherein $T^1$, $T^2$ independently representing a C1–C6 alkyl or alkoxy,
R⁸ corresponds to hydrogen or to a hydroxyl;
d=0 to 30
e=0 to 1
f=0 to 30
d+e+f≦40
wherein the attachment unit Uac of the radical Y is:

Formula 1

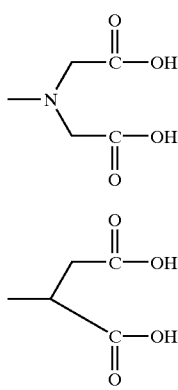

Formula 2

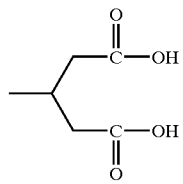

Formula 3

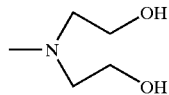

Formula 4

Formula 5

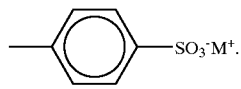

Formula 6

9. A process for preparing the polyorganosiloxanes as defined in claim 8, said process comprising the steps of reacting at least one polyalkylhydrogenosiloxane oil with at least one olefinic precursor $OP^Y$ of at least one radical Y or of a portion of at least one radical Y, and with at least one olefinic precursor $OP^W$ of at least one radical W and/or of a portion of a radical W, in the presence of an effective amount of metallic hydrosilylation catalyst.

10. A process for preparing the polyorganosiloxanes as defined in claim 8, said process comprising the steps of reacting at least one polyalkylhydrogenosiloxane oil with at least one olefinic precursor $OP^Y$ of at least one radical Y or of a portion of at least one radical Y, and with at least one olefinic precursor $OP^W$ of at least one radical W and/or of a portion of a radical W, in the presence of an effective amount of metallic hydrosilylation catalyst, and wherein precursors $OP^Y$ are bearing at least one reactive function Fr per molecule, said function Fr being

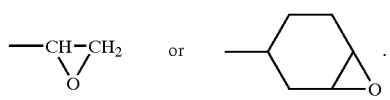

11. The process as claimed in claim 10, wherein the functions Fr of the grafts derived from the hydrosilylation of the groups $OP^Y$ are reacted with all or a portion of a precursor of at least one attachment unit Uac.

12. An aqueous silicone emulsion, comprising at least one polyorganosiloxane as defined in claim 8, at least one surfactant and, optionally, antifoams, elongational viscosity promoters, waxes, extreme-pressure additives, antirusts, or antioxidants, wherein the surfactant is an alkyldiphenyl ether disulfonate salt.

13. A process for molding a metal article using a metallic mold comprising the step of lubricating the metal surface of the mold, before or during the molding, with the POS oil as claimed in claim 8.

14. A process for molding a metal article using a metallic mold comprising the step of lubricating the metal surface of the mold, before or during the molding, with the emulsion as claimed in claim 12.

* * * * *